(12) United States Patent
Taherzadeh Boroujeni et al.

(10) Patent No.: US 12,418,330 B1
(45) Date of Patent: Sep. 16, 2025

(54) MULTIPLE-INPUT AND MULTIPLE-OUTPUT DEMODULATION FOR NON-UNIFORM MODULATION CONSTELLATIONS

(71) Applicant: QUALCOMM Incorporated, San Diego, CA (US)

(72) Inventors: Mahmoud Taherzadeh Boroujeni, San Diego, CA (US); Wei Yang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/607,969

(22) Filed: Mar. 18, 2024

(51) Int. Cl.
*H04B 7/0413* (2017.01)
*H04L 27/26* (2006.01)

(52) U.S. Cl.
CPC ....... *H04B 7/0413* (2013.01); *H04L 27/2649* (2013.01)

(58) Field of Classification Search
CPC .......................... H04L 27/2649; H04B 7/0413
See application file for complete search history.

(56) References Cited

U.S. PATENT DOCUMENTS

2020/0228386 A1\* 7/2020 Jardel ................. H04L 25/0212
2024/0243840 A1 7/2024 Wu

FOREIGN PATENT DOCUMENTS

WO WO-2022222094 A1 10/2022
WO WO-2023216177 A1 11/2023

OTHER PUBLICATIONS

International Search Report and Written Opinion—PCT/US2025/014727—ISA/EPO—May 30, 2025.

\* cited by examiner

*Primary Examiner* — Rahel Guarino
(74) *Attorney, Agent, or Firm* — Holland & Hart / QUALCOMM Incorporated

(57) ABSTRACT

Some wireless communications systems modulate signals for transmission via a channel. Probabilistic shaping may utilize non-uniformly distributed modulation constellations to increase spectral efficiency. In some cases, wireless fading may occur in a multiple-input and multiple-output (MIMO) channel, which may cause a loss of the shaping gain from probabilistic shaping. Some examples of approaches to linear MIMO demodulation for probabilistic shaping using auxiliary dimensions are provided. A wireless device may receive information indicating a non-uniform probabilistic distribution of a modulation constellation for a MIMO signal. One or more symbols of the MIMO signal may be transmitted or received via a channel. The wireless device may demodulate the symbol based at least in part on a transformation of the modulation constellation to a subspace using dimensions associated with the non-uniform probabilistic distribution and a point of the transformed modulation constellation nearest to a projected symbol in the subspace.

20 Claims, 11 Drawing Sheets

MULTIPLE-INPUT AND MULTIPLE-OUTPUT DEMODULATION FOR NON-UNIFORM MODULATION CONSTELLATIONS

FIELD OF TECHNOLOGY

The following relates to wireless communications, including multiple-input and multiple-output demodulation for non-uniform modulation constellations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some examples of the techniques described herein may provide approaches to linear multiple-input and multiple-output (MIMO) demodulation for probabilistic shaping using auxiliary dimensions. A wireless device may receive information indicating a non-uniform probabilistic distribution of a modulation constellation for a MIMO signal. A MIMO signal may be modulated using probabilistic shaping (e.g., a modulation constellation with a non-uniform probabilistic distribution). One or more symbols of the MIMO signal may be transmitted or received via a channel. For example, a wireless device may receive the one or more symbols of the MIMO signal. The wireless device may demodulate the symbol based on a transformation of the modulation constellation to a subspace using dimensions associated with the non-uniform probabilistic distribution and a point of the transformed modulation constellation nearest to a projected symbol in the subspace corresponding to the symbol. In some aspects, the wireless device may add auxiliary dimensions to the modulation constellation to account for the probabilistic shaping. For example, the modulation constellation may be transformed to a subspace using dimensions associated with the non-uniform probabilistic distribution. The wireless device may project the symbol into the subspace to generate the projected symbol to determine the point of the transformed modulation constellation that is nearest to the projected symbol in the subspace.

A method by a wireless device is described. The method may include receiving information indicating a non-uniform probabilistic distribution of a modulation constellation for a MIMO signal, receiving a symbol of the MIMO signal, the MIMO signal modulated with the non-uniform probabilistic distribution, and demodulating the symbol based on a transformation of the modulation constellation to a subspace using dimensions associated with the non-uniform probabilistic distribution and a point of the transformed modulation constellation nearest to a projected symbol in the subspace corresponding to the symbol.

A wireless device is described. The wireless device may include one or more memories storing processor executable code, and one or more processors coupled with the one or more memories. The one or more processors may individually or collectively be operable to execute the code to cause the wireless device to receive information indicating a non-uniform probabilistic distribution of a modulation constellation for a MIMO signal, receive a symbol of the MIMO signal, the MIMO signal modulated with the non-uniform probabilistic distribution, and demodulate the symbol based on a transformation of the modulation constellation to a subspace using dimensions associated with the non-uniform probabilistic distribution and a point of the transformed modulation constellation nearest to a projected symbol in the subspace corresponding to the symbol.

Another wireless device is described. The wireless device may include means for receiving information indicating a non-uniform probabilistic distribution of a modulation constellation for a MIMO signal, means for receiving a symbol of the MIMO signal, the MIMO signal modulated with the non-uniform probabilistic distribution, and means for demodulating the symbol based on a transformation of the modulation constellation to a subspace using dimensions associated with the non-uniform probabilistic distribution and a point of the transformed modulation constellation nearest to a projected symbol in the subspace corresponding to the symbol.

A non-transitory computer-readable medium storing code is described. The code may include instructions executable by one or more processors to receive information indicating a non-uniform probabilistic distribution of a modulation constellation for a MIMO signal, receive a symbol of the MIMO signal, the MIMO signal modulated with the non-uniform probabilistic distribution, and demodulate the symbol based on a transformation of the modulation constellation to a subspace using dimensions associated with the non-uniform probabilistic distribution and a point of the transformed modulation constellation nearest to a projected symbol in the subspace corresponding to the symbol.

Some examples of the method, wireless devices, and non-transitory computer-readable medium described herein may further include operations, features, means, or instructions for demodulating the symbol includes projecting the symbol into the subspace to generate the projected symbol to determine the point of the transformed modulation constellation nearest to the projected symbol.

Some examples of the method, wireless devices, and non-transitory computer-readable medium described herein may further include operations, features, means, or instructions for receiving a signal to generate an estimate of a channel, the symbol being received via the channel, where the transformation of the modulation constellation includes a transformation of a combination of the estimate of the channel and the modulation constellation.

In some examples of the method, wireless devices, and non-transitory computer-readable medium described herein, a quantity of the dimensions associated with the non-uniform probabilistic distribution may be associated with a quantity of layers of the MIMO signal.

In some examples of the method, wireless devices, and non-transitory computer-readable medium described herein, the subspace includes a quantity of dimensions that may be two times the quantity of layers of the MIMO signal and may be associated with a space with four times the quantity of layers of the MIMO signal.

Some examples of the method, wireless devices, and non-transitory computer-readable medium described herein may further include operations, features, means, or instructions for decoding a non-discretized estimate of a symbol vector that includes the symbol for a set of multiple layers of symbols to determine the point of the transformed modulation constellation nearest to the projected symbol.

In some examples of the method, wireless devices, and non-transitory computer-readable medium described herein, the non-uniform probabilistic distribution may be associated with a first layer of the MIMO signal and the method, apparatuses, and non-transitory computer-readable medium may include further operations, features, means, or instructions for receiving a second symbol of a second layer of the MIMO signal, the second layer of the MIMO signal modulated with a second non-uniform probabilistic distribution other than the non-uniform probabilistic distribution associated with the first layer and demodulating the second symbol of the second layer of the MIMO signal based on a second transformation of the modulation constellation in a second subspace using dimensions associated with the second non-uniform probabilistic distribution and a second point of the transformed modulation constellation nearest to the second symbol in the second subspace.

Some examples of the method, wireless devices, and non-transitory computer-readable medium described herein may further include operations, features, means, or instructions for receiving an indication of the second non-uniform probabilistic distribution associated with the second layer of the MIMO signal.

In some examples of the method, wireless devices, and non-transitory computer-readable medium described herein, the modulation constellation may be a quadrature amplitude modulation (QAM) constellation.

DETAILED DESCRIPTION

Figure 1:
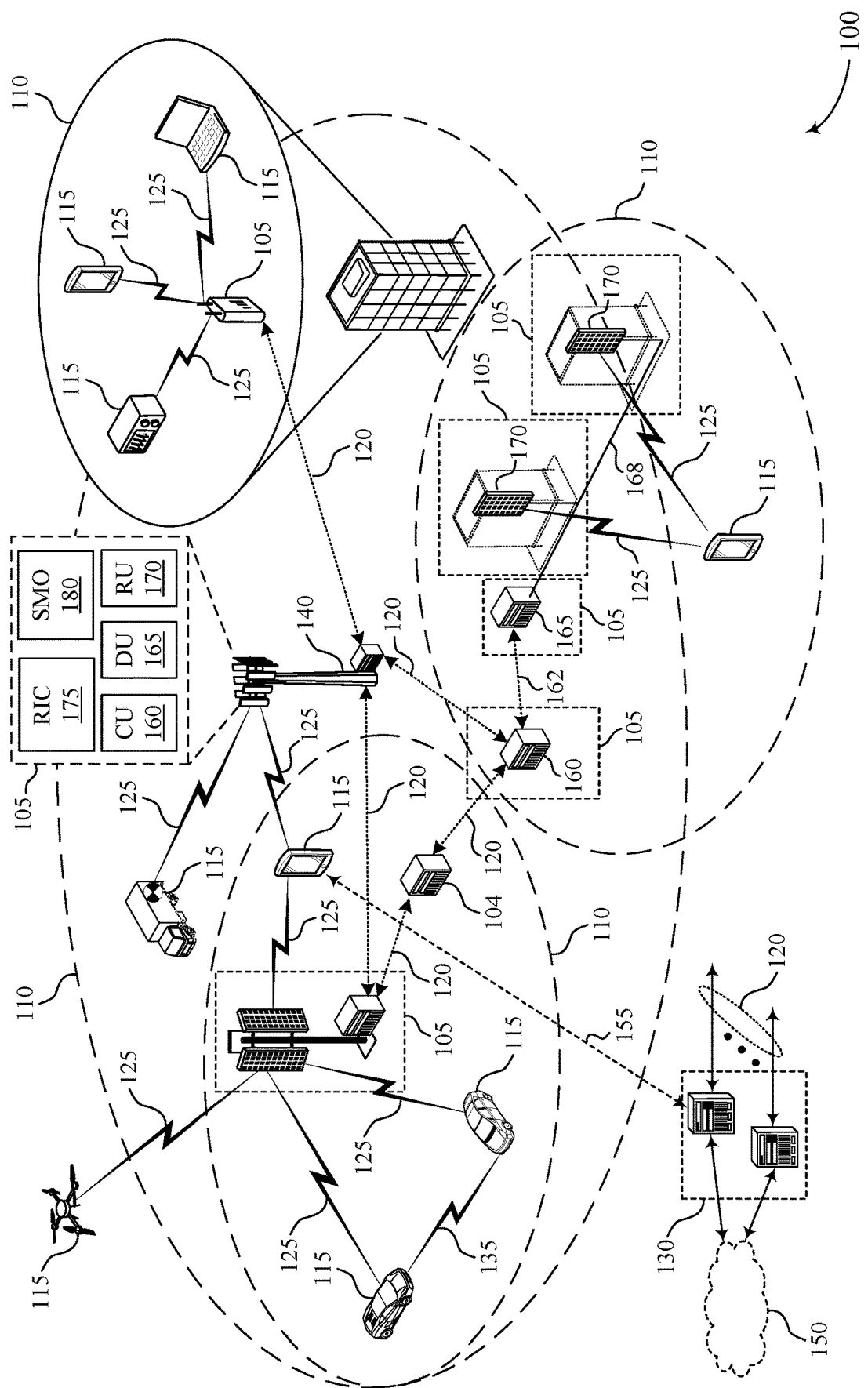
FIG. 1 shows an example of a wireless communications system that supports multiple-input and multiple-output (MIMO) demodulation for non-uniform modulation constellations in accordance with one or more aspects of the present disclosure.

Some wireless communication systems modulate signals for transmission via a channel. For example, a wireless device may modulate a signal using quadrature amplitude modulation (QAM). Some modulation schemes use modulation constellations where each point in the modulate constellation has a uniform probability for modulating symbols. Probabilistic shaping may utilize non-uniformly distributed modulation constellations to increase spectral efficiency. In some approaches, a Maxwell-Boltzmann (MB) distribution may be utilized, which may increase (e.g., maximize) source entropy for a given average power. Different approaches may be utilized to perform probabilistic shaping, such as a constant-composition distribution matcher (CCDM) approach with an MB distribution. Probabilistic shaping may be performed in an effort to close a shaping gap (e.g., a 1.53 decibel (dB) shaping gap) towards log (1+signal-to-noise ratio (SNR)) over an additive white Gaussian noise (AWGN) channel.

In some cases, wireless fading may occur in a multiple-input and multiple-output (MIMO) channel, which may cause a loss of the shaping gain from probabilistic shaping. For example, some approaches to linear MIMO demodulation may be performed using linear approaches such as zero forcing or linear minimum means square error (MMSE) techniques, which may be unable to fully realize the shaping gain from probabilistic shaping. In some varieties of linear MIMO demodulation, an inverse (or pseudo-inverse for non-square matrices) of the channel or a regularized version (via linear MMSE, for example) may be first applied to respective (e.g., separate and different) MIMO layers of the received signal, and then single-input and single-output (SISO) demodulation may be performed for each layer independently. Performing linear demodulation in this way may waste the gain of probabilistic shaping and may exhibit some performance loss compared to linear demodulation of a legacy QAM constellation. Accordingly, there may be a demand for a linear demodulation scheme that improves performance for probabilistically-shaped constellations.

Some examples of approaches to linear MIMO demodulation for probabilistic shaping using auxiliary dimensions are provided herein. A wireless device may receive information indicating a non-uniform probabilistic distribution of a modulation constellation for a MIMO signal. The MIMO signal may be modulated using probabilistic shaping (e.g., a modulation constellation with a non-uniform probabilistic distribution). One or more symbols of the MIMO signal may be transmitted or received via a channel. For example, a wireless device may receive the one or more symbols of the MIMO signal. The wireless device may demodulate the symbol based on a transformation of the modulation constellation to a subspace using dimensions associated with the non-uniform probabilistic distribution and a point of the transformed modulation constellation nearest to a projected symbol in the subspace corresponding to the symbol. In some aspects, the wireless device may add auxiliary dimensions to the modulation constellation to account for the probabilistic shaping. For example, the modulation constellation may be transformed to a subspace using dimensions associated with the non-uniform probabilistic distribution. The wireless device may project the symbol into the subspace to generate the projected symbol to determine a point of the transformed modulation constellation that is nearest to the projected symbol in the subspace.

Accounting for the non-uniform probabilistic distribution with the auxiliary dimensions may provide improved demodulation performance and spectral efficiency for modulation constellations with non-uniform probabilistic distributions. For instance, using the additional dimensions in the demodulation procedure may achieve improved spectral efficiency while avoiding wasting the gain of probabilistic shaping that may occur when performing SISO demodulation for each layer independently.

In some approaches, different probabilistic distributions may be utilized for different layers of the MIMO signal due to one or more SNR gaps among different MIMO layers, which may occur in a variety of scenarios. Some examples of demodulation approaches are provided for the use of different distributions and modulation sizes for different MIMO layers.

Aspects of the disclosure are initially described in the context of wireless communications systems. Aspects of the disclosure are also described in the context of diagrams illustrating examples of demodulation. Aspects of the disclosure are additionally described in the context of a process flow. Aspects of the disclosure are further illustrated by and described with reference to apparatus diagrams, system diagrams, and flowcharts that relate to MIMO demodulation for non-uniform modulation constellations.

FIG. 1 shows an example of a wireless communications system 100 that supports MIMO demodulation for non-uniform modulation constellations in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communication systems modulate signals for transmission via a channel. For example, a wireless device may modulate a signal using QAM. Some modulation schemes use modulation constellations where each point in the modulate constellation has a uniform probability for modulating symbols. Probabilistic shaping may utilize non-uniformly distributed modulation constellations to increase spectral efficiency. In some approaches, an MB distribution (e.g., $p(x) \sim e^{-v|x|^2}$) may be utilized, which may increase (e.g., maximize) source entropy for a given average power. Different approaches may be utilized to perform probabilistic shaping, such as a CCDM approach with an MB distribution. Probabilistic shaping may be performed in an effort to close a shaping gap (e.g., a 1.53 decibel (dB) shaping gap) towards log (1+SNR) over an AWGN channel.

In some cases, wireless fading may occur in a MIMO channel, which may cause a loss of the shaping gain from probabilistic shaping. For example, some approaches to linear MIMO demodulation may be performed using linear approaches such as zero forcing or linear MMSE techniques, which may be unable to fully realize the shaping gain from probabilistic shaping. In some varieties of linear MIMO demodulation, an inverse (or pseudo-inverse for non-square matrices) of the channel or a regularized version (via linear MMSE, for example) may be first applied to respective (e.g., separate and different) MIMO layers of the received signal, and then SISO demodulation may be performed for each layer independently. Performing linear demodulation in this way may waste the gain of probabilistic shaping and may exhibit some performance loss compared to linear demodulation of a legacy QAM constellation. Accordingly, there may be a demand for a linear demodulation scheme that improves performance for probabilistically-shaped constellations.

Some examples of approaches to linear MIMO demodulation for probabilistic shaping using auxiliary dimensions are provided herein. A wireless device (e.g., a UE 115 or a network entity 105) may receive information indicating a non-uniform probabilistic distribution of a modulation constellation for a MIMO signal. A MIMO signal may be modulated using probabilistic shaping (e.g., a modulation constellation with a non-uniform probabilistic distribution). One or more symbols of the MIMO signal may be transmitted or received via a channel. For example, a wireless device (e.g., a UE 115 or a network entity 105) may receive the one or more symbols of the MIMO signal. The wireless device may demodulate the symbol based on a transformation of the modulation constellation to a subspace using dimensions associated with the non-uniform probabilistic distribution and a point of the transformed modulation constellation nearest to a projected symbol in the subspace corresponding to the symbol. In some aspects, the wireless device may add auxiliary dimensions to the modulation constellation to account for the probabilistic shaping. For example, the modulation constellation may be transformed to a subspace using dimensions associated with the non-uniform probabilistic distribution. The wireless device may project the symbol into the subspace to generate the projected symbol to determine a point of the transformed modulation constellation that is nearest to the projected symbol in the subspace.

Accounting for the non-uniform probabilistic distribution with the auxiliary dimensions may provide improved demodulation performance and spectral efficiency for modulation constellations with non-uniform probabilistic distributions. For instance, using the additional dimensions in the demodulation procedure may achieve improved spectral efficiency while avoiding wasting the gain of probabilistic shaping that may occur when performing SISO demodulation for each layer independently.

In some approaches, different probabilistic distributions may be utilized for different layers of the MIMO signal due to one or more SNR gaps among different MIMO layers, which may occur in a variety of scenarios. Some examples of demodulation approaches are provided for the use of different distributions and modulation sizes for different MIMO layers.

Figure 2:
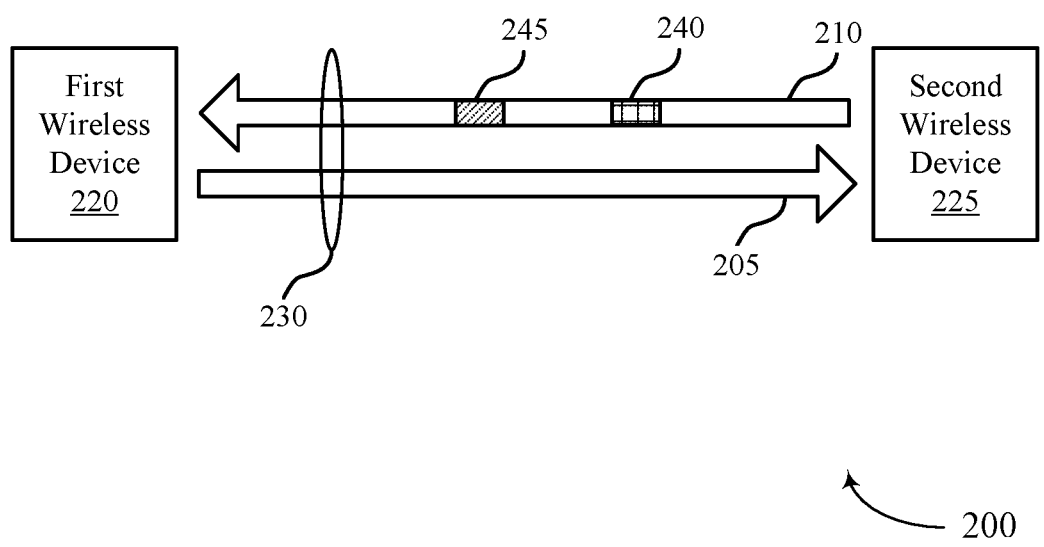
FIG. 2 shows an example of a wireless communications system that supports MIMO demodulation for non-uniform modulation constellations in accordance with one or more aspects of the present disclosure.

FIG. 2 shows an example of a wireless communications system 200 that supports MIMO demodulation for non-uniform modulation constellations in accordance with one or more aspects of the present disclosure. The wireless communications system 200 may implement aspects of or may be implemented by aspects of the wireless communications system 100. For example, the wireless communications system 200 includes a first wireless device 220, which may be an example of a UE 115 or a network entity 105 described with respect to FIG. 1, or another wireless device. The wireless communications system 200 also includes a second wireless device 225, which may be an example of a UE 115 or a network entity 105 as described with respect to FIG. 1, or another wireless device.

The first wireless device 220 may communicate with the second wireless device 225 using a communication link 230. In some examples, the communication link 230 may be an example of a communication link 125 described with respect to FIG. 1. The communication link 230 may include a bi-directional link that enables uplink or downlink network communications. For example, the first wireless device 220 may transmit one or more transmissions 205, such as control signals or data signals, to the second wireless device 225 using the communication link 230, or the second wireless device 225 may transmit one or more transmissions 210, such as control signals or data signals, to the first wireless device 220 using the communication link 230.

The second wireless device 225 may transmit, to the first wireless device 220, information 245 indicating a non-uniform probabilistic distribution of a modulation constellation for a MIMO signal. The first wireless device 220 may receive the information 245. A modulation constellation may be a set of points representing symbols (e.g., modulation symbols). For example, a signal may be modulated to produce one or more symbols. The symbols may differ from each other in phase, amplitude, or frequency. The modulation constellation may include a point for each symbol that may be transmitted. For instance, each point of the modulation constellation may be expressed in quadrature and in-phase dimensions. Examples of the modulation constellation may include a QAM (e.g., 8 QAM, 16 QAM, 32 QAM, 64 QAM, or 128 QAM, among other examples) constellation, a quadrature phase-shift keying (QPSK) constellation, an amplitude-shift keying (ASK) constellation, or a frequency-shift keying (FSK) constellation, among other examples. In some modulation constellations, some points may be located more closely to the origin than other points in a space with in-phase and quadrature dimensions. For instance, points that are relatively nearer to the origin may utilize relatively less energy or power for transmission, and points that are relatively further from the origin may utilize relatively more energy or power for transmission.

A non-uniform probabilistic distribution of a modulation constellation may be a distribution of points of a modulation constellation, where at least two points of the modulation constellation have different probabilities of being transmitted. In some non-uniform probabilistic distributions, points that are nearer to the origin (or points that utilize lower energy or power for transmission) may be transmitted more frequently or a may have a greater probability of transmission than points that are further from the origin (or points that utilize higher energy or power for transmission), which may be transmitted less frequently or may have a lower probability for transmission. For example, some modulation constellations may utilize the MB distribution, $Pr(x) \sim e^{-\nu|x|^2}$, where $Pr(x)$ denotes the probability of transmitting a point x (e.g., a 2N-dimensional modulation point with a transmission power or a distance of the point from the origin) and v is a scaling factor. Accordingly, the probability of transmitting a point may decrease as the transmission power or distance from the origin increases.

In some examples, the information 245 indicating the non-uniform probabilistic distribution may include one or more indexes associated with the non-uniform probabilistic distribution, one or more factors for determining the non-uniform probabilistic distribution (e.g., one or more scaling factors), one or more values indicating one or more transmission probabilities for one or more points of the modulation constellation, or one or more other indications of the non-uniform probabilistic distribution. For instance, the second wireless device 225 (e.g., a network entity) may transmit the information 245 with downlink control information (DCI) or an RRC message.

In some aspects, the information 245 may indicate one or more non-uniform probabilistic distributions relative to one or more modulation constellations with uniform probabilistic distributions. For instance, the information 245 indicating the non-uniform probabilistic distribution may indicate one or more probability values for one or more respective points of a modulation constellation. In some examples, the information 245 may include an index indicating a non-uniform probabilistic distribution associated with a modulation constellation.

In some aspects, the non-uniform probabilistic distribution is included in a set of probabilistic distributions. For instance, the second wireless device 225, the first wireless device 220, or both may store a record of a set of probabilistic distributions or associated modulation constellations. The information 245 may indicate a selected non-uniform probabilistic distribution (or a modulation constellation with a non-uniform probabilistic distribution) from the set of probabilistic distributions. For instance, the second wireless device 225 may transmit an indicator of a modulation and coding scheme (MCS) that indicates a selected non-uniform probabilistic distribution (or a modulation constellation with a non-uniform probabilistic distribution).

The first wireless device 220 may receive one or more symbols 240 of the MIMO signal. The MIMO signal may be modulated with the non-uniform probabilistic distribution. For example, the first wireless device 220 may receive the one or more symbols 240 via multiple antennas of the first wireless device 220.

The first wireless device 220 may demodulate the one or more symbols 240 of the MIMO signal. In some approaches, a symbol 240 may be demodulated based on a transformation of the modulation constellation to a subspace using dimensions associated with the non-uniform probabilistic distribution or a point of the transformed modulation constellation nearest to a projected symbol (corresponding to the symbol 240) in the subspace. In some examples, demodulating the symbol 240 may include performing the transformation of the modulation constellation. Additionally, or alternatively, demodulating the symbol 240 may include determining (e.g., selecting) the point of the transformed modulation constellation nearest to the projected symbol. In some approaches, the transformation or the determination of the point may be performed separately from the demodulation. In some aspects, the demodulation may include determining one or more bits corresponding to the point of the transformed modulation constellation nearest to the projected symbol.

Demodulating the one or more symbols 240 may be based on a channel (e.g., an estimate of the channel) of the MIMO signal. In some approaches, the first wireless device 220 may receive a signal (e.g., one or more reference signals) to generate an estimate of the channel. The one or more symbols 240 of the MIMO signal may be received via the channel.

In some aspects, MIMO-Demodulation for Probabilistic Shaping using added auxiliary dimensions (for MB distribution) may be performed. In an example, the first wireless device 220 may transform the modulation constellation to a subspace to demodulate the one or more symbols 240. For example, MIMO demodulation for probabilistic shaping may utilize the dimensions (e.g., added auxiliary dimensions) associated with the non-uniform probabilistic distribution. In some approaches, a quantity of the dimensions associated with the non-uniform probabilistic distribution may be associated with a quantity of layers (e.g., N) of the MIMO signal. For an MB distribution with N MIMO layers and with an input scaling for the MB prior (e.g., $p(x) \propto -|x|^2$), lattice basis reduction may be utilized to reduce the translated 2N-dimensional lattice of MIMO constellation points in a multidimensional (e.g., 4N-dimensional) space. Transforming the modulation constellation may result in tilting a channel matrix due to MB distribution maximum a posteriori (MAP) geometry. An example of transforming the modulation constellation to the subspace is provided with reference to FIG. 4.

The transformation of the modulation constellation may include a transformation of a combination of the estimate of the channel (e.g., H) and the modulation constellation. If $\{x\}$ are 2N-dimensional modulation points from the modulation constellation (e.g., from a QAM constellation) and H is a channel matrix, for instance, Hx may represent a received point (e.g., a lattice point of the modulation constellation) without noise, and Hx+w may denote a received modulation point at the first wireless device (e.g., receiver) after the effect of an additive noise vector (e.g., w).

In some aspects, demodulating a symbol 240 may include determining a nearest lattice point of $$\begin{bmatrix} ax \\ Hx \end{bmatrix}$$

to the point $$\begin{bmatrix} 0 \\ Hx + w \end{bmatrix}$$

in a 4N-dimensional real space (or a 2N-dimensional complex space). With the geometric effect of MAP decoding of probabilistic shaping, for instance, demodulating a symbol 240 may include determining a nearest lattice point of $$\begin{bmatrix} ax \\ Hx \end{bmatrix}$$

to the point $$y_2 = \begin{bmatrix} 0 \\ Hx + w \end{bmatrix} = \begin{bmatrix} 0 \\ y \end{bmatrix}$$

in a 4N-dimensional real space (or a 2N-dimensional complex space), where y denotes the received symbol 240. In some examples, the coefficient a (in ax) may depend on one or more parameters of the MB distribution and a noise power (or signal-to-noise ratio (SNR)) of the channel). In some examples, the coefficient a (in ax) may depend on one or more other parameters of the signal transmission or channel (e.g., statistics of the fading channel).

In some aspects, demodulating a symbol 240 of the MIMO signal may include projecting the symbol into the subspace to generate the projected symbol to determine the point of the transformed modulation constellation nearest to the projected symbol. In some examples, a linear solution may involve projection of the received signal $$y_2 = \begin{bmatrix} 0 \\ Hx + w \end{bmatrix} = \begin{bmatrix} 0 \\ y \end{bmatrix}$$

to a subspace spanned by $$H_2 = \begin{bmatrix} 0 & aI \\ 0 & H \end{bmatrix},$$

where I denotes the identity matrix. In some examples, the projection may be performed to obtain the point $y_3=Py_2$, where P denotes a projection matrix $P=H_2 (H_2^*H_2)^{-1}H_2^*$, where * denotes the conjugate transpose.

In some aspects, the first wireless device 220 may determine the point x based on $y_3$ by applying the pseudo-inverse (or Moore-Penrose inverse) of $$H_3 = \begin{bmatrix} aI \\ H \end{bmatrix}; x' = H_3^+ y_3, \text{ where } H_3^+ = (H_3^*H_3)^{-1} H_3^*,$$

$$\text{and } (H_3^*H_3)^{-1} = [a \cdot a^* I + H^*H]^{-1}.$$

The quantity x' may be a non-discretized linear estimate of the transmit symbol vector x. The described formulation may also apply to N MIMO layers in N-dimensional complex space (with N additional auxiliary dimensions for MIMO demodulation with probabilistic shaping).

Some examples of the techniques described herein may perform demodulation (other than using projection to a subspace in a larger space, for instance) utilizing $[a \cdot a^*I+H^*H]^{-1}$, rather than $[H]^{-1}$. Utilizing $[a \cdot a^*I+H^*H]^{-1}$ may provide a type of regularization that may help to reduce orthogonality defects of H. Regularization (e.g., linear minimum mean square error (MMSE) instead of zero forcing) may be applied, in some approaches, to introduce some bias for reducing the effective variance of noise (e.g., reducing the variance of the estimate). Regularization is applied herein to provide an improved MAP estimate (rather than maximum likelihood). Another enhancement of regularization (e.g., reducing the orthogonality defect and reducing the effective variance of noise) may also be provided. The amount of regularization may be selected based on a prior distribution of the constellation (for implementing MAP, rather than a maximum likelihood (ML) estimate, for example. As described herein, regularization may be applied to produce reduced variance in the estimate as a tradeoff with the introduced added bias.

In some examples, the first wireless device 220 may decode the non-discretized estimate (e.g., x') of a symbol vector (e.g., x) that includes the symbol for a plurality of layers of symbols to determine the point of the transformed modulation constellation nearest to the projected symbol. For instance, after determining the non-discretized linear estimate (e.g., x'), the non-discretized linear estimate may be utilized for hard decoding or soft decoding of each layer of data symbols. In some approaches, one or more SISO techniques may be utilized to determine the nearest point in the corresponding complex plane for hard decoding or detection of uncoded symbols.

Additionally, or alternatively, one or more modified SISO techniques may be utilized for log likelihood ratio (LLR) calculation (or for obtaining other soft decoding metrics for each layer separately). For LLR calculations for each layer, a distance metric to a constellation point $x_{i,j}$ on a jth layer may be given by $D=D_h+D(x_i', x_{i,j})$, where $D_h$ is a distance of $y_2$ to the subspace spanned by $$H_2 = \begin{bmatrix} 0 & aI \\ 0 & H \end{bmatrix}.$$

In some examples, $D_h$ may be the same for some (e.g., all) layers and some (e.g., all) constellation points. For instance, $D_h$ may be dependent on the received signal vector (e.g., may only depend on the received signal vector).

In some aspects, the first wireless device 220 may demodulate the one or more symbols 240 utilizing different probability distributions for at least two layers (e.g., spatial layers). For instance, the first wireless device 220 may perform MIMO demodulation for probabilistic shaping with different rates or modulation distributions per layer.

In some examples, a first non-uniform probabilistic distribution may be associated with a first layer of the MIMO signal. The first wireless device 220 may receive a second symbol 240 of a second layer of the MIMO signal, where the second layer of the MIMO signal is modulated with a second non-uniform probabilistic distribution other than the first non-uniform probabilistic distribution associated with the first layer. The first wireless device 220 may demodulate the second symbol of the second layer of the MIMO signal based on a transformation (e.g., a second transformation) of the modulation constellation in a second subspace using dimensions associated with the second non-uniform probabilistic distribution and a second point of the transformed modulation constellation (that is transformed using the second transformation, for instance) nearest to the second symbol in the second subspace.

In some examples, the first wireless device 220 may receive an indication of the second non-uniform probabilistic distribution associated with the second layer of the MIMO signal. For instance, the information 245 may provide the indication of the second non-uniform probabilistic distribution.

In some approaches, MIMO-Demodulation for probabilistic shaping with different rates or modulation distribution per layer may be applied. For example, a vector of coefficients $a=[a_1, a_2, \ldots, a_{2N}]^T$ corresponding to BM distributions for N MIMO layers may be utilized (where $a_k$ and $a_{2k+1}$ correspond to associated coefficients for the kth MIMO layer, for example). Each of the coefficients may be associated with a geometric interpretation of MAP decoding.

The first wireless device 220 may project a received 4N-dimensional point to a 2N-dimensional subspace spanned by probabilistically shaped demodulation-equivalent receive constellation points $$\begin{bmatrix} a^T \cdot x \\ Hx \end{bmatrix}$$

to obtain x*, where T denotes the matrix transpose. In some approaches, the first wireless may perform operations similar to those described herein (which may be utilized for the same probabilistic distribution on each layer), except with $$H_2 = \begin{bmatrix} 0 & a^T I \\ 0 & H \end{bmatrix} \text{ and } H_3 = \begin{bmatrix} a^T I \\ H \end{bmatrix}.$$

Utilizing different non-uniform distributions per layer may enhance demodulation performance per layer due to a potential SNR gap among different MIMO layers.

In some examples, the first wireless device 220 may transmit capability signaling to the second wireless device 225 indicating a capability of the first wireless device 220 to receive or demodulate one or more symbols 240 of a MIMO signal modulated with one or more non-uniform probabilistic distributions. For instance, the capability signaling may indicate that the first wireless device 220 may demodulate a symbol 240 based on one non-uniform probability distribution or multiple non-uniform probability distributions.

In some examples, the second wireless device 225 may transmit one or more configuration signaling to the first wireless device 220 to configure the first wireless device 220 to receive or demodulate one or more symbols 240 of a MIMO signal modulated with one or more non-uniform probabilistic distributions. For instance, the configuration signaling may instruct the first wireless device 220 to demodulate a symbol 240 based on one non-uniform probability distribution or multiple non-uniform probability distributions. In some examples, the configuration signaling may be sent in response to receiving the capability signaling.

The one or more symbols 240 that are demodulated by the first wireless device 220 may indicate data or control information in some examples. In some examples, the first wireless device 220 may perform one or more operations on the demodulated symbol(s). For example, the first wireless device 220 may perform decoding or deformatting to obtain the data or control information.

Figure 3:
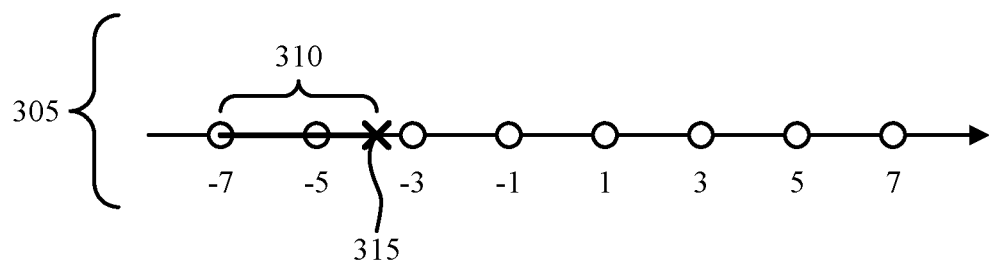
FIG. 3 shows diagrams illustrating examples of demodulation that support demodulation for modulation constellations in accordance with one or more aspects of the present disclosure.
Figure 3:
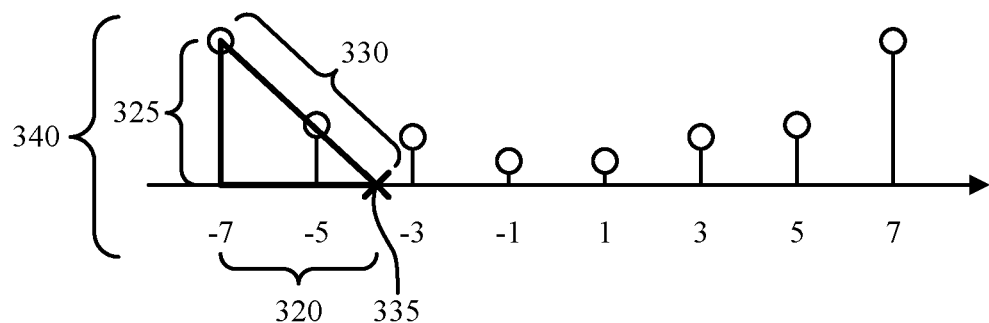
Figure 3:
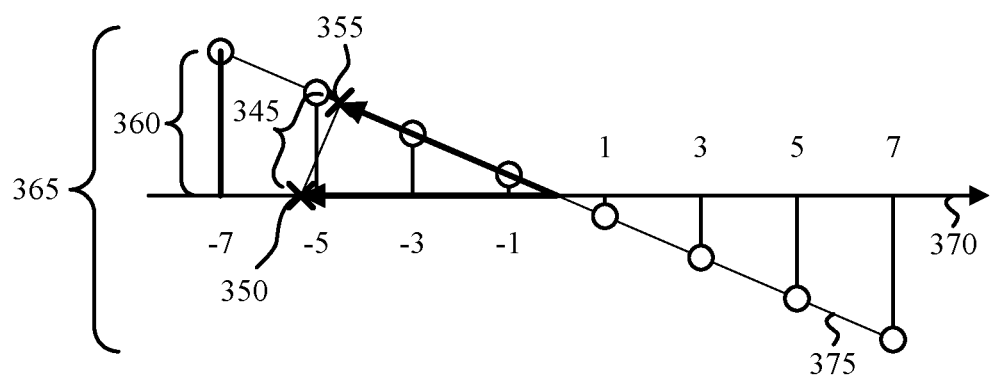

FIG. 3 shows diagrams 300 illustrating examples of demodulation that support demodulation for modulation constellations in accordance with one or more aspects of the present disclosure. In particular, FIG. 3 illustrates a first example of demodulation 305 for uniform QAM for SISO, a second example of demodulation 340 for a probabilistically shaped constellation for SISO, and a third example of demodulation 365 for a probabilistically shaped constellation using an MB prior for SISO.

In the first example, a QAM constellation with uniform probability is utilized, where the points in the QAM constellation have the same probability of transmission. For instance, a first received signal 315 (e.g., y) may be received, and a first distance 310 of the first received signal 315 from a constellation point may be determined to select a constellation point nearest to the first received signal 315. In the first example, the first received signal 315 is depicted after equalization. The first distance 310 may be expressed as a distance metric $D(x)=|y-hx|^2/N_0$.

To demodulate uniform QAM (in Gaussian noise), the log-likelihood $\log Pr(y|x)$ may be equivalent to the distance metric:

$$-\log Pr(y|x) \propto D(x) = \frac{|y-hx|^2}{N_0}.$$

In this case, the maximum likelihood may be expressed as: $x^*=\mathrm{argmax}_{x \in S} Pr(y|x)=\mathrm{argmin}_x D(x)$. The logarithmic maximum a posteriori (LOG-MAP) may be expressed as:

$$LLR(b_i) = \ln\left(\frac{\sum_{x \in S_0} Pr(y|x)}{\sum_{x \in S_1} Pr(y|x)}\right) \propto \ln\left(\frac{\sum_{x \in S_0} e^{-D_x}}{\sum_{x \in S_1} e^{-D_x}}\right).$$

The maximum LOG-MAP may be expressed as $LLR(b_i) \propto \min_{x \in S_1} D(x) - \min_{x \in S_0} D(x)$.

In the second example, a probabilistically shaped QAM constellation is utilized, where the points in the QAM constellation have differing probabilities of transmission. For instance, a second received signal 335 (e.g., y) may be received, and a second distance 330 of the second received signal 335 from a constellation point may be determined to select a constellation point nearest to the second received signal 335. In the second example, the second received signal 335 is depicted after equalization. The second distance 330 may be expressed as $\sqrt{D(x)}$. A base distance 320 may be expressed as $|y-hx|^2/N_0$. A probability distance 325 may be expressed as $-\log Pr(x)$.

For the probabilistically shaped QAM constellation, the log-likelihood function may include symbol priors: $\log Pr(x) Pr(y|x)$. The distance metric may be expressed as:

$$D(x) = \frac{|y-hx|^2}{N_0} - \log Pr(x) = \frac{|y-hx|^2}{N_0} - v|x|^2.$$

In this case, the maximum likelihood, LOG-MAP, and maximum LOG-MAP generalize to the probabilistically shaped case by using the distance metric $D(x)$.

In the third example, a probabilistically shaped QAM constellation is utilized with an MB prior for SISO. In some of the approaches described herein, input scaling may be performed to the channel (H) and the received symbol 350 (y) and demodulation (e.g., QAM demodulation) may be utilized based on the input scaling.

For a modulation constellation with a uniform transmission probability across the symbols in a SISO case, applying the effect of the channel to the modulation constellation yields constellation points on the axis 370 shown in the third example. With a non-uniform probability, a wireless device may apply input scaling, which has the effect of rotating the points along a line 375 for a SISO case. A quantity of rotation of the line 375 may be related to a distance 360 (e.g., $\sqrt{-\log Pr(x)} \propto |x|$). To determine a nearest constellation point to a received symbol 350 (y), the wireless device may project 345 the symbol 350 to the line 375 to determine a projected symbol 355. The nearest constellation point to the projected symbol 355 may be determined along the line 375. For instance, for the MB prior ($\log Pr(x) \propto -|x|^2$), the distance computation or calculation may be performed in accordance with the third example of demodulation 365. The distance computation or calculation may be performed for multiple layers (e.g., a signal layer or an interference layer) in some approaches.

Some of the approaches described herein may utilize a transformation of a modulation constellation for MIMO with additional dimensions, where the modulation constellation is transformed to a subspace based on the probabilistic shaping. A received symbol may be projected to the subspace to generate a projected symbol to determine the nearest constellation point in the subspace.

Figure 4:
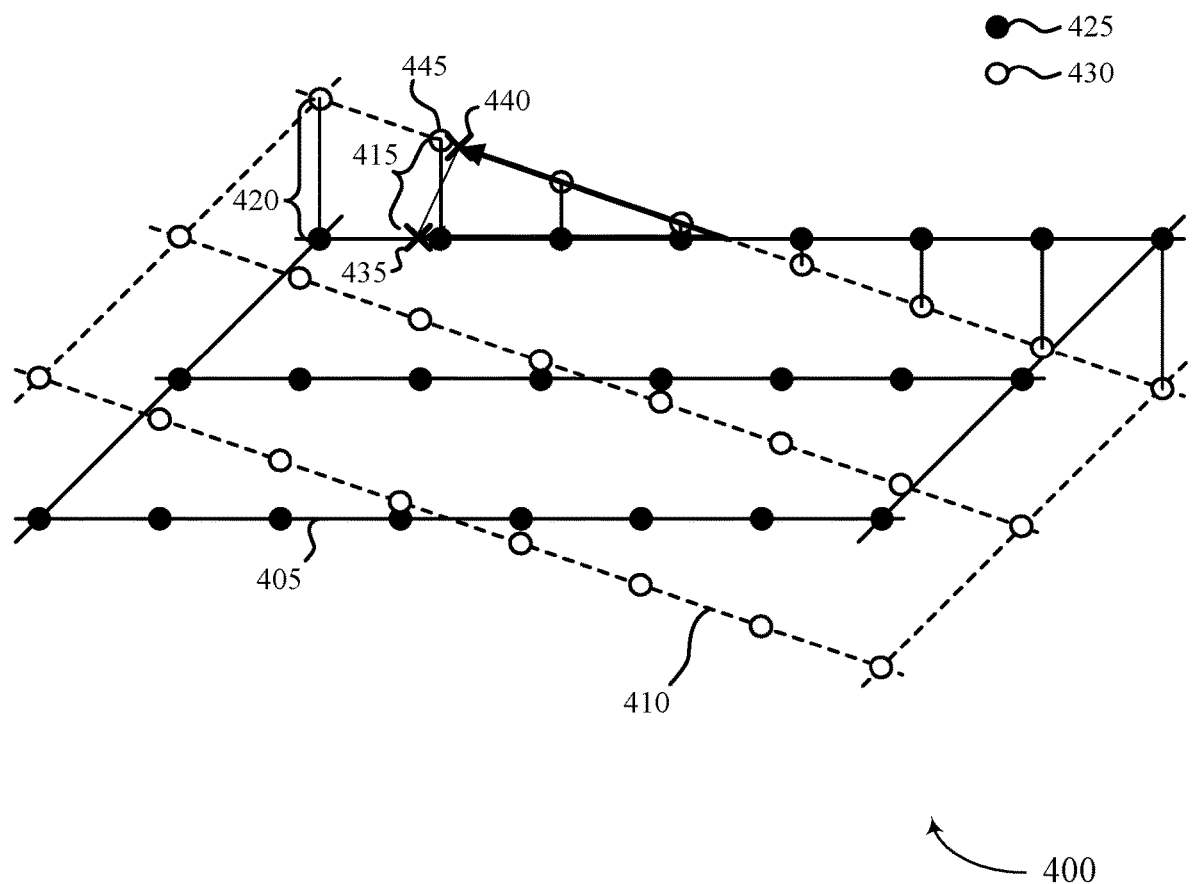
FIG. 4 shows a diagram illustrating an example of demodulation that supports MIMO demodulation for non-uniform modulation constellations in accordance with one or more aspects of the present disclosure.

FIG. 4 shows a diagram 400 illustrating an example of demodulation that supports MIMO demodulation for non-uniform modulation constellations in accordance with one or more aspects of the present disclosure. In particular, FIG. 4 illustrates an example of a modulation constellation 425, where points of the modulation constellation 425 are depicted with filled circles. At the wireless device (e.g., receiver), the modulation constellation 425 may be included in a first subspace 405 (depicted with solid lines). The first subspace 405 may be a 2N-dimensional subspace of a 4N-dimensional space that includes the lattice of received constellation points after the effect of the channel (e.g., channel matrix or H).

To perform demodulation in some approaches, a wireless device may generate an estimate of the channel (e.g., H). The wireless device may apply the estimate of the channel (and an additive noise vector w, for instance) to a default constellation to generate the modulation constellation 425 (e.g., Hx+w).

The wireless device may transform the modulation constellation 425 to a second subspace 410 (depicted with dashed lines) using dimensions associated with the non-uniform probabilistic distribution. In some examples, the second subspace 410 may include a quantity of dimensions that is two times the quantity of layers of a MIMO signal and may be associated with a space with four times the quantity of layers of the MIMO signal. For instance, the wireless device may transform the modulation constellation 425 to a second subspace 410, which may be a 2N-dimensional subspace of a 4N-dimensional space including the lattice of constellation points 430 (depicted with empty circles) after the effect of channel matrix and input scaling due to an MB prior distribution. The lattice of constellation points 430 may be expressed as, as $$\begin{bmatrix} ax \\ Hx \end{bmatrix},$$

as described with reference to FIG. 2. The transformation may be related to a distance 420 (e.g., a distance computation for the MB prior $\sqrt{-\log Pr(x)} \propto |x|$).

A received symbol 435 may be included in the subspace 405. For example, the received symbol 435 may be expressed as $$y_2 = \begin{bmatrix} 0 \\ Hx + w \end{bmatrix} = \begin{bmatrix} 0 \\ y \end{bmatrix},$$

where $y_2$ may be calculated based on a symbol (a received symbol y before accounting for the channel, for instance), the channel estimate, and the additive noise w.

The wireless device may project 415 the received symbol 435 into the second subspace 410. For instance, the wireless device may project the received symbol 435 (e.g., $y_2$) to the subspace spanned by $$H_2 = \begin{bmatrix} 0 & aI \\ 0 & H \end{bmatrix}$$

to obtain a projected symbol 440. In some examples, the projection may be performed to obtain the point $y_3 = Py_2$, where P denotes a projection matrix $P = H_2 (H_2^* H_2)^{-1} H_2^*$, where * denotes the conjugate transpose (e.g., $y_3 = Py_2$ as described with reference to FIG. 2).

In some examples, the wireless device may determine the nearest point 445 of the modulation constellation to the projected symbol 440 to demodulate the received symbol. For instance, the wireless device may determine the nearest point 445 (e.g., x) based on $y_3$ by applying the pseudo-inverse (or Moore-Penrose in verse) of $$H_3 = \begin{bmatrix} aI \\ H \end{bmatrix}; x' = H_3^+ y_3, \text{ where } H_3^+ = (H_3^* H_3)^{-1} H_3^*,$$

$$\text{and } (H_3^* H_3)^{-1} = [a \cdot a^* I + H^* H]^{-1}.$$

The quantity x' may be a non-discretized linear estimate of the transmit symbol vector x, and the coefficient a may be a value based on one or more parameters of the probabilistic shaping (e.g., MB) distribution, a noise power (e.g., SNR of the channel), or one or more other parameters of the signal transmission or channel (e.g., statistics of the fading channel). Additionally, or alternatively, the wireless device may determine a distance (e.g., Euclidean distance) between the projected symbol 440 and each of the lattice of constellation points 430. The wireless device may determine (e.g., select) the nearest point 445 (e.g., a point with the least distance from the projected symbol 440).

The nearest point 445 may be the determined point for demodulation. For example, the wireless device may determine (e.g., generate or extract) one or more bits associated with (e.g., mapped to) the nearest point 445.

Figure 5:
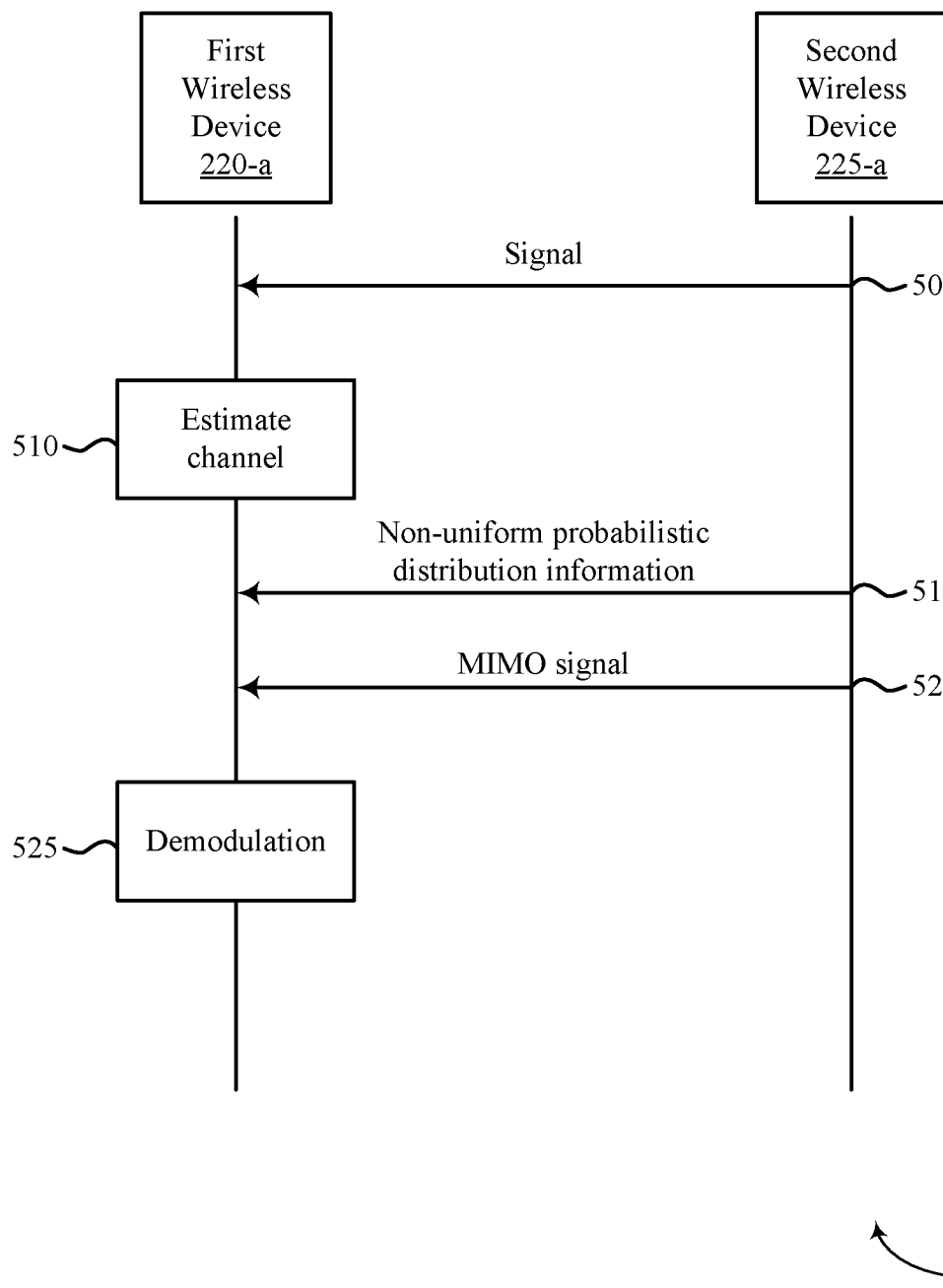
FIG. 5 shows an example of a process flow that supports MIMO demodulation for non-uniform modulation constellations in accordance with one or more aspects of the present disclosure.

FIG. 5 shows an example of a process flow 500 that supports MIMO demodulation for non-uniform modulation constellations in accordance with one or more aspects of the present disclosure. A wireless communications system may include a first wireless device 220-a and a second wireless device 225-a. The first wireless device 220-a may be an example of the first wireless device 220 (e.g., UE 115 or network entity 105), and the second wireless device 225-a may be an example of the second wireless device 225 (e.g., network entity 105 or UE 115), as described herein.

In the following description of the process flow 500, the operations between the second wireless device 225-a and the first wireless device 220-a may be transmitted in a different order than the example order shown, or the operations performed by the second wireless device 225-a and the first wireless device 220-a may be performed in different orders or at different times. Some operations may be omitted from the process flow 500, or other operations may be added to the process flow 500. Further, although some operations or signaling may be shown to occur at different times for discussion purposes, these operations may actually occur at the same time or in overlapping time periods in some examples.

At 505, the second wireless device 225-a may transmit (e.g., output) a signal (e.g., reference signal, sounding signal, among other examples) to the second wireless device 225-a. For example, the first wireless device 220-a may receive the signal (e.g., obtain) as described with reference to FIG. 2.

At 510, the first wireless device 220-a may estimate a channel based on the signal. For example, the first wireless device 220-a may store a template signal with one or more target characteristics (e.g., frequency, amplitude, or phase). The first wireless device 220-a may estimate the channel (e.g., H) based on a computation using the signal and the template signal indicating the effect of the channel on the signal.

At 515, the second wireless device 225-a may output information indicating a non-uniform probabilistic distribution. For example, the information may indicate a non-uniform probabilistic distribution of a modulation constellation using one or more explicit indications (e.g., indices, values) or implicit indications (e.g., timing or formatting). The first wireless device 220-a may receive the information as described with reference to FIG. 2.

At 520, the second wireless device 225-a may output a MIMO signal. The MIMO signal may be modulated in accordance with the non-uniform probabilistic distribution. For instance, the MIMO signal may be modulated based on an MB distribution. The first wireless device 220-a may receive the MIMO signal as described with reference to FIG. 2.

At 525, the first wireless device 220-a may demodulate one or more symbols of the MIMO signal. For instance, the first wireless device 220-a may transform a modulation constellation to a subspace using dimensions associated with the non-uniform probabilistic distribution. The first wireless device 220-*a* may project a received symbol of the MIMO signal to the subspace. The first wireless device 220-*a* may determine a point of the transformed modulation constellation nearest to the projected symbol. In some examples, the first wireless device 220-*a* may perform hard decoding or soft decoding. In some approaches, the first wireless device 220-*a* may employ one or more aspects described with respect to FIG. 1, FIG. 2, FIG. 3, or FIG. 4 to demodulate one or more symbols of the MIMO signal.

Figure 6:
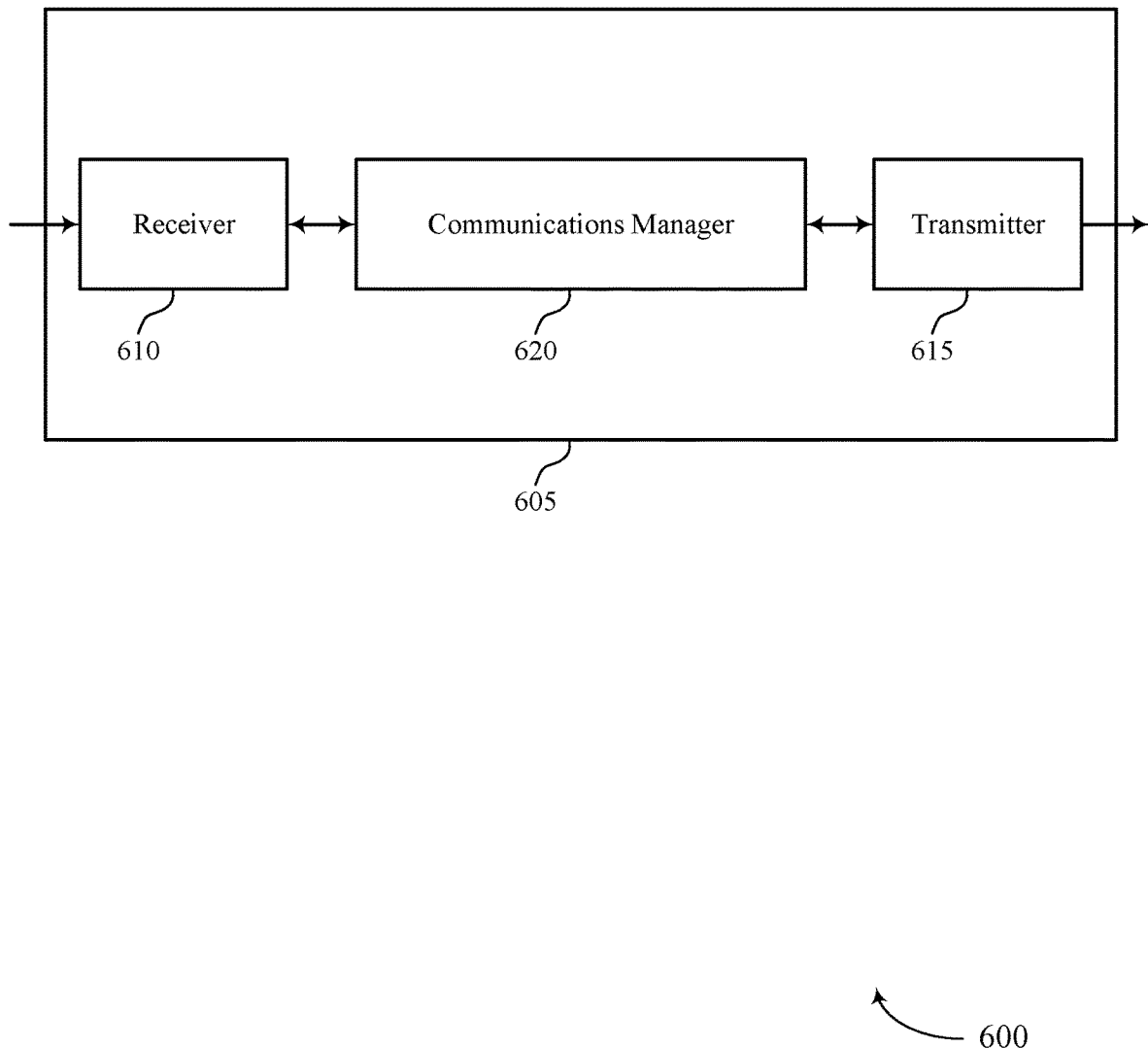
FIGS. 6 and 7 show block diagrams of devices that support MIMO demodulation for non-uniform modulation constellations in accordance with one or more aspects of the present disclosure.

FIG. 6 shows a block diagram 600 of a device 605 that supports MIMO demodulation for non-uniform modulation constellations in accordance with one or more aspects of the present disclosure. The device 605 may be an example of aspects of a wireless device as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to MIMO demodulation for non-uniform modulation constellations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to MIMO demodulation for non-uniform modulation constellations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations or components thereof may be examples of means for performing various aspects of MIMO demodulation for non-uniform modulation constellations as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor (e.g., referred to as a processor-executable code). If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 is capable of, configured to, or operable to support a means for receiving information indicating a non-uniform probabilistic distribution of a modulation constellation for a MIMO signal. The communications manager 620 is capable of, configured to, or operable to support a means for receiving a symbol of the MIMO signal, the MIMO signal modulated with the non-uniform probabilistic distribution. The communications manager 620 is capable of, configured to, or operable to support a means for demodulating the symbol based on a transformation of the modulation constellation to a subspace using dimensions associated with the non-uniform probabilistic distribution and a point of the transformed modulation constellation nearest to a projected symbol in the subspace corresponding to the symbol.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced power consumption or more efficient utilization of communication resources.

Figure 7:
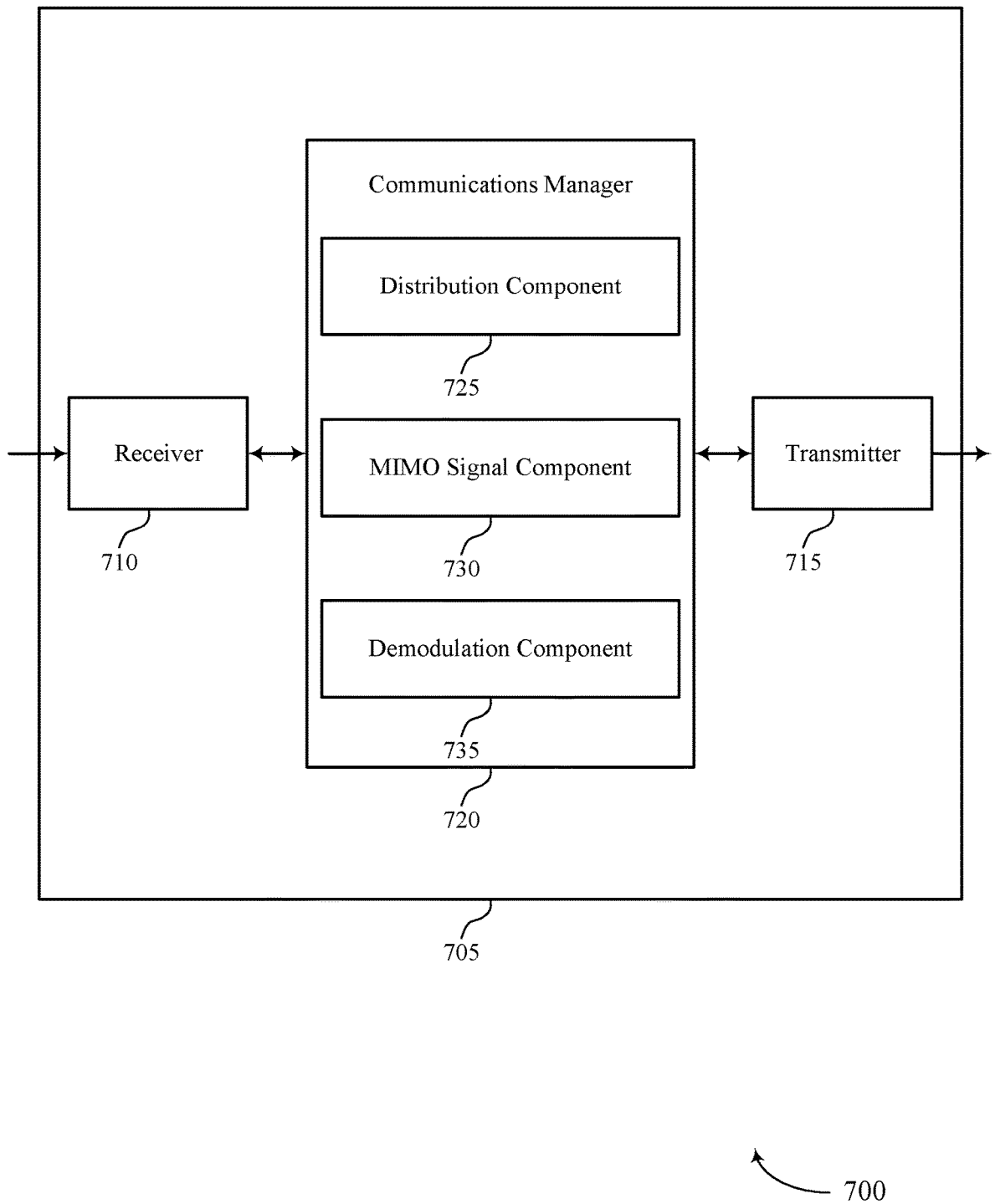

FIG. 7 shows a block diagram 700 of a device 705 that supports MIMO demodulation for non-uniform modulation constellations in accordance with one or more aspects of the present disclosure. The device 705 may be an example of aspects of a device 605 or a wireless device (e.g., a UE 115 or a network entity 105) as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to MIMO demodulation for non-uniform modulation constellations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to MIMO demodulation for non-uniform modulation constellations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of MIMO demodulation for non-uniform modulation constellations as described herein. For example, the communications manager 720 may include a distribution component 725, a MIMO signal component 730, a demodulation component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The distribution component 725 is capable of, configured to, or operable to support a means for receiving information indicating a non-uniform probabilistic distribution of a modulation constellation for a MIMO signal. The MIMO signal component 730 is capable of, configured to, or operable to support a means for receiving a symbol of the MIMO signal, the MIMO signal modulated with the non-uniform probabilistic distribution. The demodulation component 735 is capable of, configured to, or operable to support a means for demodulating the symbol based on a transformation of the modulation constellation to a subspace using dimensions associated with the non-uniform probabilistic distribution and a point of the transformed modulation constellation nearest to a projected symbol in the subspace corresponding to the symbol.

Figure 8:
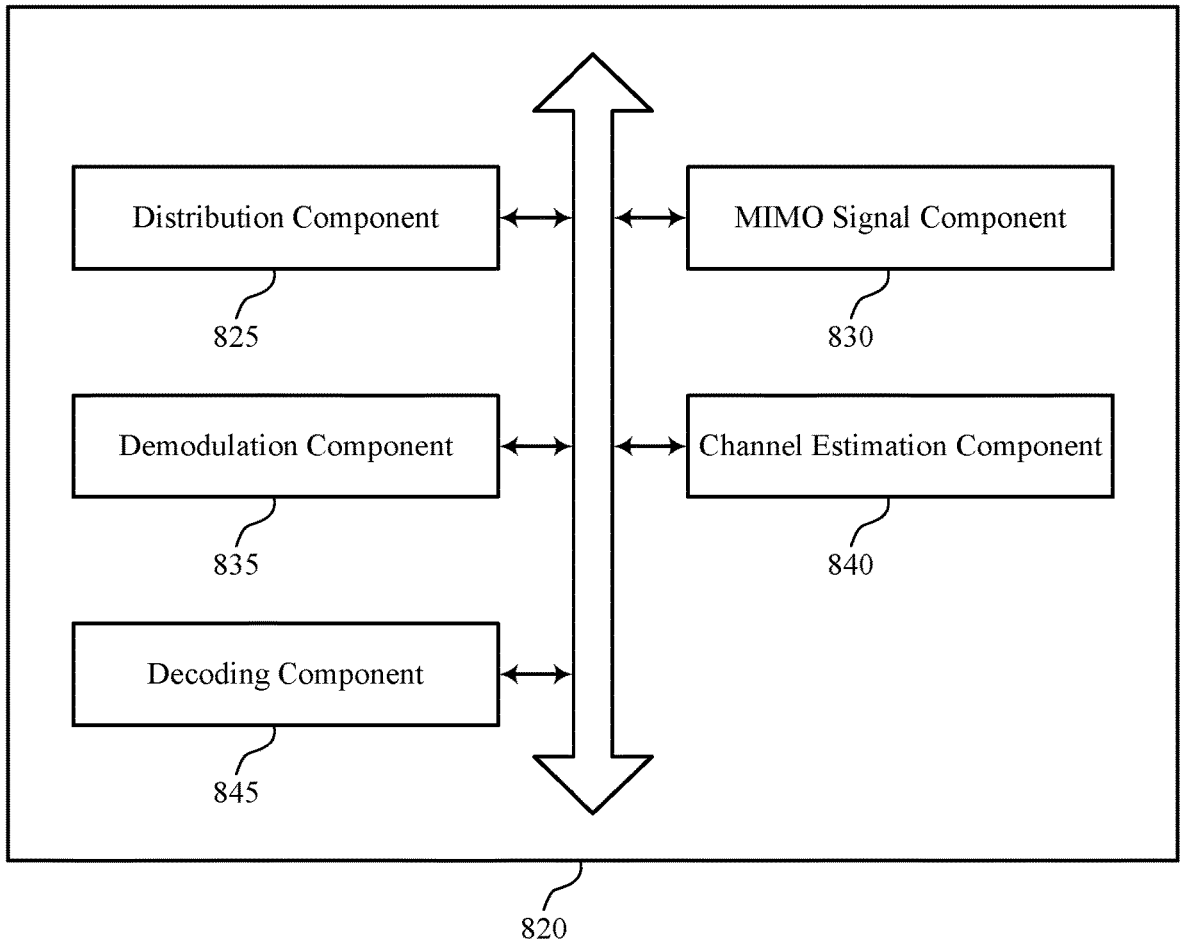
FIG. 8 shows a block diagram of a communications manager that supports MIMO demodulation for non-uniform modulation constellations in accordance with one or more aspects of the present disclosure.

FIG. 8 shows a block diagram 800 of a communications manager 820 that supports MIMO demodulation for non-uniform modulation constellations in accordance with one or more aspects of the present disclosure. The communications manager 820 may be an example of aspects of a communications manager 620, a communications manager 720, or both, as described herein. The communications manager 820, or various components thereof, may be an example of means for performing various aspects of MIMO demodulation for non-uniform modulation constellations as described herein. For example, the communications manager 820 may include a distribution component 825, a MIMO signal component 830, a demodulation component 835, a channel estimation component 840, a decoding component 845, or any combination thereof. Each of these components, or components or subcomponents thereof (e.g., one or more processors, one or more memories), may communicate, directly or indirectly, with one another (e.g., via one or more buses).

The distribution component 825 is capable of, configured to, or operable to support a means for receiving information indicating a non-uniform probabilistic distribution of a modulation constellation for a MIMO signal. The MIMO signal component 830 is capable of, configured to, or operable to support a means for receiving a symbol of the MIMO signal, the MIMO signal modulated with the non-uniform probabilistic distribution. The demodulation component 835 is capable of, configured to, or operable to support a means for demodulating the symbol based on a transformation of the modulation constellation to a subspace using dimensions associated with the non-uniform probabilistic distribution and a point of the transformed modulation constellation nearest to a projected symbol in the subspace corresponding to the symbol.

In some examples, demodulating the symbol includes projecting the symbol into the subspace to generate the projected symbol to determine the point of the transformed modulation constellation nearest to the projected symbol.

In some examples, the channel estimation component 840 is capable of, configured to, or operable to support a means for receiving a signal to generate an estimate of a channel, the symbol being received via the channel, where the transformation of the modulation constellation includes a transformation of a combination of the estimate of the channel and the modulation constellation.

In some examples, a quantity of the dimensions associated with the non-uniform probabilistic distribution is associated with a quantity of layers of the MIMO signal.

In some examples, the subspace includes a quantity of dimensions that is two times the quantity of layers of the MIMO signal and is associated with a space with four times the quantity of layers of the MIMO signal.

In some examples, the decoding component 845 is capable of, configured to, or operable to support a means for decoding a non-discretized estimate of a symbol vector that includes the symbol for a set of multiple layers of symbols to determine the point of the transformed modulation constellation nearest to the projected symbol.

In some examples, the non-uniform probabilistic distribution is associated with a first layer of the MIMO signal, and the MIMO signal component 830 is capable of, configured to, or operable to support a means for receiving a second symbol of a second layer of the MIMO signal, the second layer of the MIMO signal modulated with a second non-uniform probabilistic distribution other than the non-uniform probabilistic distribution associated with the first layer. In some examples, the non-uniform probabilistic distribution is associated with a first layer of the MIMO signal, and the demodulation component 835 is capable of, configured to, or operable to support a means for demodulating the second symbol of the second layer of the MIMO signal based on a transformation (e.g., a second transformation) of the modulation constellation in a second subspace using dimensions associated with the second non-uniform probabilistic distribution and a second point of the transformed modulation constellation (that is transformed with the second transformation, for instance) nearest to the second symbol in the second subspace.

In some examples, the distribution component 825 is capable of, configured to, or operable to support a means for receiving an indication of the second non-uniform probabilistic distribution associated with the second layer of the MIMO signal.

In some examples, the modulation constellation is a QAM constellation.

Figure 9:
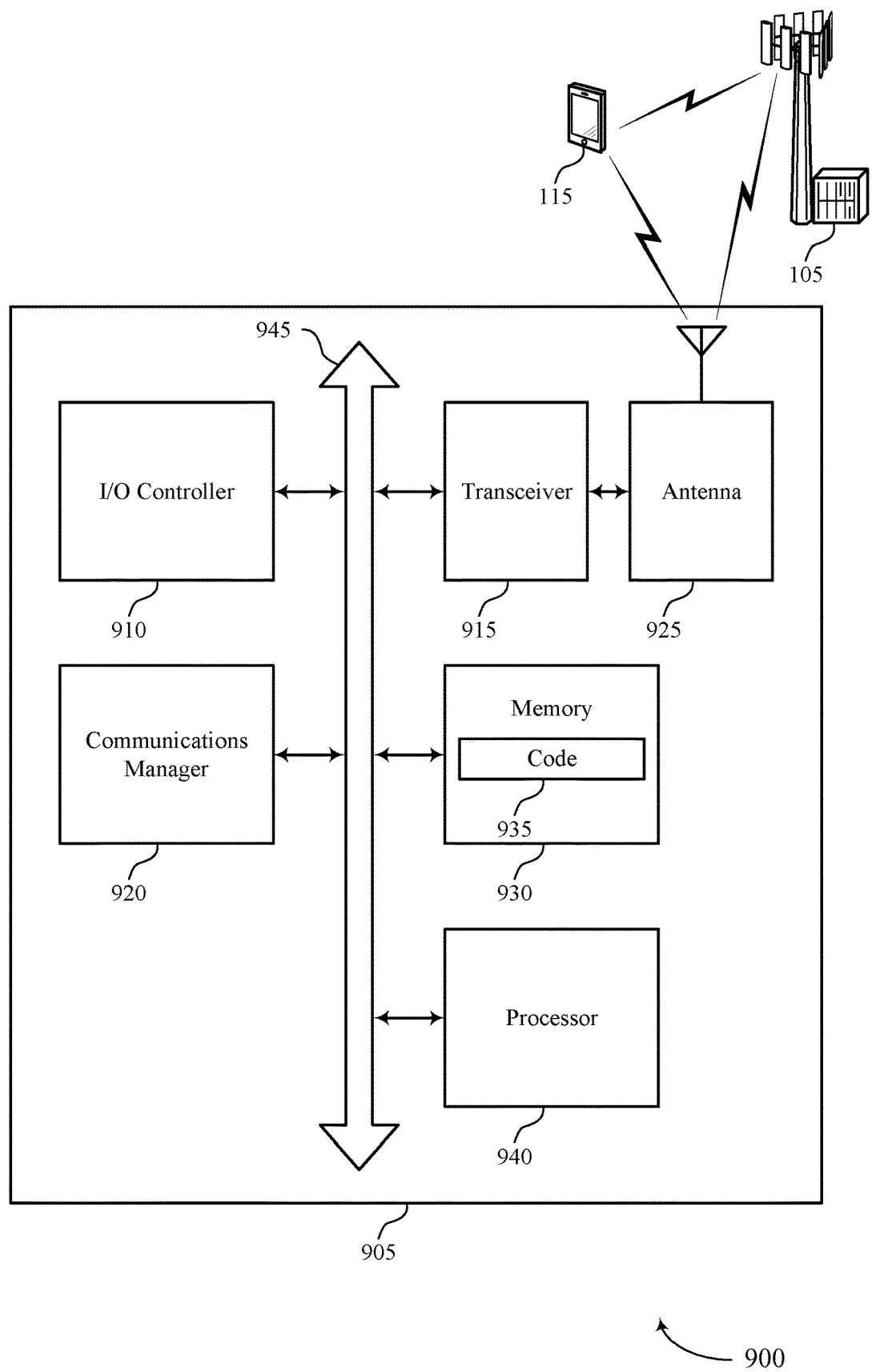
FIG. 9 shows a diagram of a system including a device that supports MIMO demodulation for non-uniform modulation constellations in accordance with one or more aspects of the present disclosure.

FIG. 9 shows a diagram of a system 900 including a device 905 that supports MIMO demodulation for non-uniform modulation constellations in accordance with one or more aspects of the present disclosure. The device 905 may be an example of or include components of a device 605, a device 705, or a wireless device as described herein. The device 905 may include components for bi-directional voice and data communications including components for transmitting and receiving communications, such as a communications manager 920, an I/O controller, such as an I/O controller 910, a transceiver 915, one or more antennas 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna. However, in some other cases, the device 905 may have more than one antenna, which may be capable of concurrently transmitting or receiving multiple wireless transmissions. The transceiver 915 may communicate bi-directionally via the one or more antennas 925 using wired or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include RAM and ROM. The at least one memory 930 may store computer-readable, computer-executable, or processor-executable code, such as the code 935. The code 935 may include instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein.

In some cases, the at least one memory 930 may include, among other things, a BIOS which may control basic hardware or software operation such as the interaction with peripheral components or devices.

The at least one processor 940 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting MIMO demodulation for non-uniform modulation constellations). For example, the device 905 or a component of the device 905 may include at least one processor 940 and at least one memory 930 coupled with or to the at least one processor 940, the at least one processor 940 and the at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions described herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code 935 (e.g., processor-executable code) stored in the at least one memory 930 or otherwise, to perform one or more of the functions described herein.

For example, the communications manager 920 is capable of, configured to, or operable to support a means for receiving information indicating a non-uniform probabilistic distribution of a modulation constellation for a MIMO signal. The communications manager 920 is capable of, configured to, or operable to support a means for receiving a symbol of the MIMO signal, the MIMO signal modulated with the non-uniform probabilistic distribution. The communications manager 920 is capable of, configured to, or operable to support a means for demodulating the symbol based on a transformation of the modulation constellation to a subspace using dimensions associated with the non-uniform probabilistic distribution and a point of the transformed modulation constellation nearest to a projected symbol in the subspace corresponding to the symbol.

By including or configuring the communications manager 920 in accordance with examples as described herein, the device 905 may support techniques for improved communication reliability, reduced latency, more efficient utilization of communication resources, improved coordination between devices, longer battery life, or improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of MIMO demodulation for non-uniform modulation constellations as described herein, or the at least one processor 940 and the at least one memory 930 may be otherwise configured to, individually or collectively, perform or support such operations.

Figure 10:
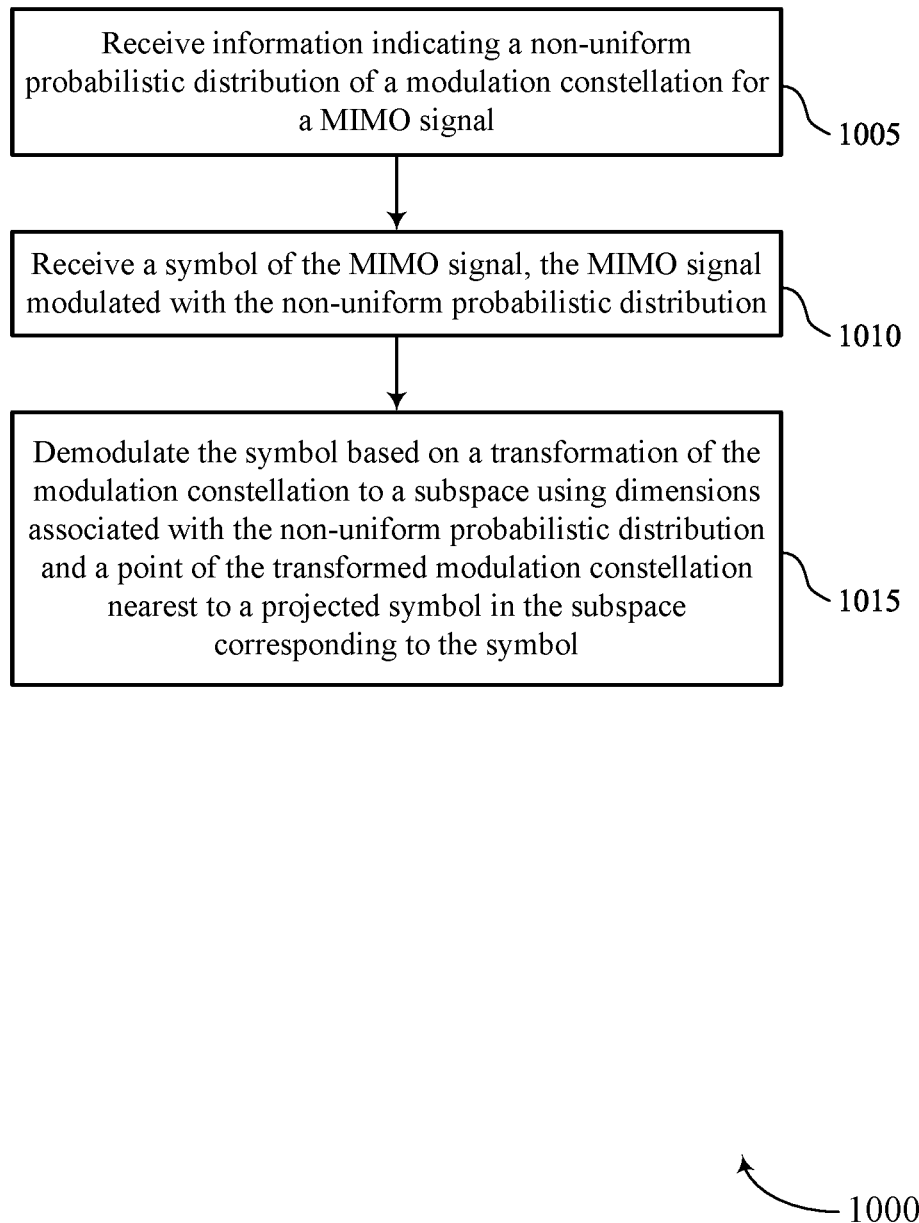
FIGS. 10 and 11 show flowcharts illustrating methods that support MIMO demodulation for non-uniform modulation constellations in accordance with one or more aspects of the present disclosure.

FIG. 10 shows a flowchart illustrating a method 1000 that supports MIMO demodulation for non-uniform modulation constellations in accordance with one or more aspects of the present disclosure. The operations of the method 1000 may be implemented by a wireless device or its components as described herein. For example, the operations of the method 1000 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1005, the method may include receiving information indicating a non-uniform probabilistic distribution of a modulation constellation for a MIMO signal. The operations of 1005 may be performed in accordance with examples as disclosed herein. In some examples, aspects of the operations of 1005 may be performed by a distribution component 825 as described with reference to FIG. 8.

At 1010, the method may include receiving a symbol of the MIMO signal, the MIMO signal modulated with the non-uniform probabilistic distribution. The operations of 1010 may be performed in accordance with examples as disclosed herein. In some examples, aspects of the operations of 1010 may be performed by a MIMO signal component 830 as described with reference to FIG. 8.

At 1015, the method may include demodulating the symbol based on a transformation of the modulation constellation to a subspace using dimensions associated with the non-uniform probabilistic distribution and a point of the transformed modulation constellation nearest to a projected symbol in the subspace corresponding to the symbol. The operations of 1015 may be performed in accordance with examples as disclosed herein. In some examples, aspects of the operations of 1015 may be performed by a demodulation component 835 as described with reference to FIG. 8.

Figure 11:
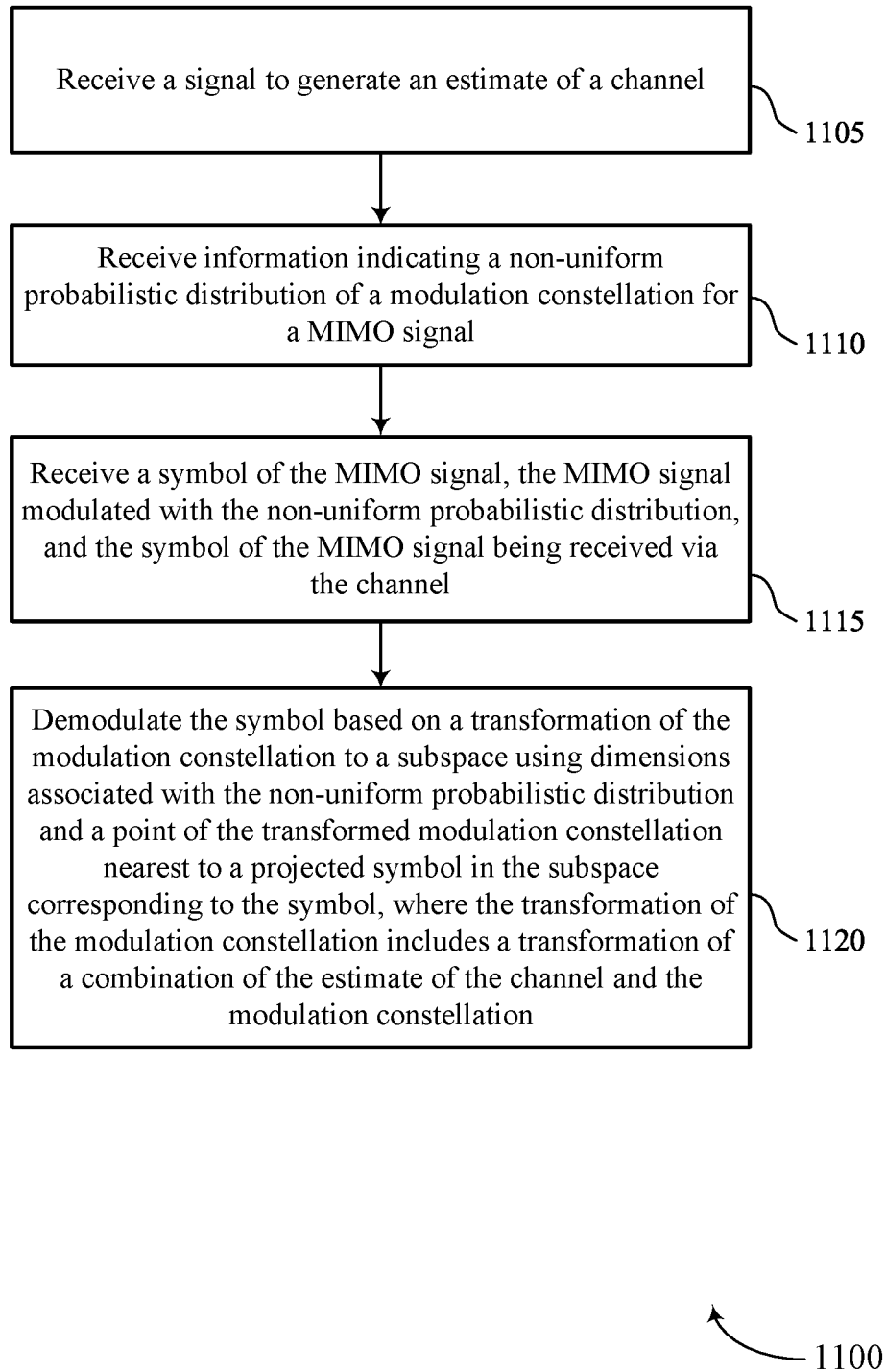

FIG. 11 shows a flowchart illustrating a method 1100 that supports MIMO demodulation for non-uniform modulation constellations in accordance with one or more aspects of the present disclosure. The operations of the method 1100 may be implemented by a wireless device or its components as described herein. For example, the operations of the method 1100 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1105, the method may include receiving a signal to generate an estimate of a channel. The operations of 1105 may be performed in accordance with examples as disclosed herein. In some examples, aspects of the operations of 1105 may be performed by a channel estimation component 840 as described with reference to FIG. 8.

At 1110, the method may include receiving information indicating a non-uniform probabilistic distribution of a modulation constellation for a MIMO signal. The operations of 1110 may be performed in accordance with examples as disclosed herein. In some examples, aspects of the operations of 1110 may be performed by a distribution component 825 as described with reference to FIG. 8.

At 1115, the method may include receiving a symbol of the MIMO signal, the MIMO signal modulated with the non-uniform probabilistic distribution, and the symbol being received via the channel. The operations of 1115 may be performed in accordance with examples as disclosed herein. In some examples, aspects of the operations of 1115 may be performed by a MIMO signal component 830 as described with reference to FIG. 8.

At 1120, the method may include demodulating the symbol based on a transformation of the modulation constellation to a subspace using dimensions associated with the non-uniform probabilistic distribution and a point of the transformed modulation constellation nearest to a projected symbol in the subspace corresponding to the symbol, where the transformation of the modulation constellation includes a transformation of a combination of the estimate of the channel and the modulation constellation. The operations of 1120 may be performed in accordance with examples as disclosed herein. In some examples, aspects of the operations of 1120 may be performed by a demodulation component 835 as described with reference to FIG. 8.

The following provides an overview of aspects of the present disclosure:

Aspect 1: A method for wireless communications by a wireless device, comprising: receiving information indicating a non-uniform probabilistic distribution of a modulation constellation for a MIMO signal; receiving a symbol of the MIMO signal, the MIMO signal modulated with the non-uniform probabilistic distribution; and demodulating the symbol based at least in part on a transformation of the modulation constellation to a subspace using dimensions associated with the non-uniform probabilistic distribution and a point of the transformed modulation constellation nearest to a projected symbol in the subspace corresponding to the symbol.

Aspect 2: The method of aspect 1, wherein demodulating the symbol comprises projecting the symbol into the subspace to generate the projected symbol to determine the point of the transformed modulation constellation nearest to the projected symbol.

Aspect 3: The method of any of aspects 1 through 2, further comprising: receiving a signal to generate an estimate of a channel, the symbol being received via the channel, wherein the transformation of the modulation constellation comprises a transformation of a combination of the estimate of the channel and the modulation constellation.

Aspect 4: The method of any of aspects 1 through 3, wherein a quantity of the dimensions associated with the non-uniform probabilistic distribution is associated with a quantity of layers of the MIMO signal.

Aspect 5: The method of aspect 4, wherein the subspace includes a quantity of dimensions that is two times the quantity of layers of the MIMO signal and is associated with a space with four times the quantity of layers of the MIMO signal.

Aspect 6: The method of any of aspects 1 through 5, further comprising: decoding a non-discretized estimate of a symbol vector that includes the symbol for a plurality of layers of symbols to determine the point of the transformed modulation constellation nearest to the projected symbol.

Aspect 7: The method of any of aspects 1 through 6, wherein the non-uniform probabilistic distribution is associated with a first layer of the MIMO signal, the method further comprising: receiving a second symbol of a second layer of the MIMO signal, the second layer of the MIMO signal modulated with a second non-uniform probabilistic distribution other than the non-uniform probabilistic distribution associated with the first layer; and demodulating the second symbol of the second layer of the MIMO signal based at least in part on a second transformation of the modulation constellation in a second subspace using dimensions associated with the second non-uniform probabilistic distribution and a second point of the transformed modulation constellation nearest to the second symbol in the second subspace.

Aspect 8: The method of aspect 7, further comprising: receiving an indication of the second non-uniform probabilistic distribution associated with the second layer of the MIMO signal.

Aspect 9: The method of any of aspects 1 through 8, wherein the modulation constellation is a QAM constellation.

Aspect 10: A wireless device comprising one or more memories storing processor-executable code, and one or more processors coupled with the one or more memories and individually or collectively operable to execute the code to cause the wireless device to perform a method of any of aspects 1 through 9.

Aspect 11: A wireless device comprising at least one means for performing a method of any of aspects 1 through 9.

Aspect 12: A non-transitory computer-readable medium storing code the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
   one or more memories storing processor-executable code; and
   one or more processors coupled with the one or more memories and individually or collectively operable to execute the code to cause the wireless device to:
      receive information indicating a non-uniform probabilistic distribution of a modulation constellation for a multiple-input and multiple-output (MIMO) signal;
      receive a symbol of the MIMO signal, the MIMO signal modulated with the non-uniform probabilistic distribution; and
      demodulate the symbol based at least in part on a transformation of the modulation constellation to a subspace using dimensions associated with the non-uniform probabilistic distribution and a point of the transformed modulation constellation nearest to a projected symbol in the subspace corresponding to the symbol.

2. The wireless device of claim 1, wherein to demodulate the symbol, the one or more processors are individually or collectively operable to execute the code to cause the wireless device to project the symbol into the subspace to generate the projected symbol to determine the point of the transformed modulation constellation nearest to the projected symbol.

3. The wireless device of claim 1, wherein the one or more processors are individually or collectively further operable to execute the code to cause the wireless device to:
   receive a signal to generate an estimate of a channel, the symbol being received via the channel,
   wherein the transformation of the modulation constellation comprises a transformation of a combination of the estimate of the channel and the modulation constellation.

4. The wireless device of claim 1, wherein a quantity of the dimensions associated with the non-uniform probabilistic distribution is associated with a quantity of layers of the MIMO signal.

5. The wireless device of claim 4, wherein the subspace includes a quantity of dimensions that is two times the quantity of layers of the MIMO signal and is associated with a space with four times the quantity of layers of the MIMO signal.

6. The wireless device of claim 1, wherein the one or more processors are individually or collectively further operable to execute the code to cause the wireless device to:
  decode a non-discretized estimate of a symbol vector that includes the symbol for a plurality of layers of symbols to determine the point of the transformed modulation constellation nearest to the projected symbol.

7. The wireless device of claim 1, wherein the non-uniform probabilistic distribution is associated with a first layer of the MIMO signal, and the one or more processors are individually or collectively further operable to execute the code to cause the wireless device to:
  receive a second symbol of a second layer of the MIMO signal, the second layer of the MIMO signal modulated with a second non-uniform probabilistic distribution other than the non-uniform probabilistic distribution associated with the first layer; and
  demodulate the second symbol of the second layer of the MIMO signal based at least in part on a second transformation of the modulation constellation in a second subspace using dimensions associated with the second non-uniform probabilistic distribution and a second point of the transformed modulation constellation nearest to the second symbol in the second subspace.

8. The wireless device of claim 7, wherein the one or more processors are individually or collectively further operable to execute the code to cause the wireless device to:
  receive an indication of the second non-uniform probabilistic distribution associated with the second layer of the MIMO signal.

9. The wireless device of claim 1, wherein the modulation constellation is a quadrature amplitude modulation (QAM) constellation.

10. A method for wireless communications by a wireless device, comprising:
  receiving information indicating a non-uniform probabilistic distribution of a modulation constellation for a multiple-input and multiple-output (MIMO) signal;
  receiving a symbol of the MIMO signal, the MIMO signal modulated with the non-uniform probabilistic distribution; and
  demodulating the symbol based at least in part on a transformation of the modulation constellation to a subspace using dimensions associated with the non-uniform probabilistic distribution and a point of the transformed modulation constellation nearest to a projected symbol in the subspace corresponding to the symbol.

11. The method of claim 10, wherein demodulating the symbol comprises projecting the symbol into the subspace to generate the projected symbol to determine the point of the transformed modulation constellation nearest to the projected symbol.

12. The method of claim 10, further comprising:
  receiving a signal to generate an estimate of a channel, the symbol being received via the channel,
  wherein the transformation of the modulation constellation comprises a transformation of a combination of the estimate of the channel and the modulation constellation.

13. The method of claim 10, wherein a quantity of the dimensions associated with the non-uniform probabilistic distribution is associated with a quantity of layers of the MIMO signal.

14. The method of claim 13, wherein the subspace includes a quantity of dimensions that is two times the quantity of layers of the MIMO signal and is associated with a space with four times the quantity of layers of the MIMO signal.

15. The method of claim 10, further comprising:
  decoding a non-discretized estimate of a symbol vector that includes the symbol for a plurality of layers of symbols to determine the point of the transformed modulation constellation nearest to the projected symbol.

16. The method of claim 10, wherein the non-uniform probabilistic distribution is associated with a first layer of the MIMO signal, the method further comprising:
  receiving a second symbol of a second layer of the MIMO signal, the second layer of the MIMO signal modulated with a second non-uniform probabilistic distribution other than the non-uniform probabilistic distribution associated with the first layer; and
  demodulating the second symbol of the second layer of the MIMO signal based at least in part on a second transformation of the modulation constellation in a second subspace using dimensions associated with the second non-uniform probabilistic distribution and a second point of the transformed modulation constellation nearest to the second symbol in the second subspace.

17. The method of claim 16, further comprising:
  receiving an indication of the second non-uniform probabilistic distribution associated with the second layer of the MIMO signal.

18. The method of claim 10, wherein the modulation constellation is a quadrature amplitude modulation (QAM) constellation.

19. A non-transitory computer-readable medium storing code, the code comprising instructions executable by one or more processors to:
  receive information indicating a non-uniform probabilistic distribution of a modulation constellation for a multiple-input and multiple-output (MIMO) signal;
  receive a symbol of the MIMO signal, the MIMO signal modulated with the non-uniform probabilistic distribution; and
  demodulate the symbol based at least in part on a transformation of the modulation constellation to a subspace using dimensions associated with the non-uniform probabilistic distribution and a point of the transformed modulation constellation nearest to a projected symbol in the subspace corresponding to the symbol.

20. The non-transitory computer-readable medium of claim 19, wherein to demodulate the symbol, the code comprises instructions executable by one or more processors to project the symbol into the subspace to generate the projected symbol to determine the point of the transformed modulation constellation nearest to the projected symbol.

* * * * *